(12) United States Patent
Movshovitz-Attias et al.

(10) Patent No.: US 12,112,134 B2
(45) Date of Patent: Oct. 8, 2024

(54) METHODS FOR EMOTION CLASSIFICATION IN TEXT

(71) Applicant: Google LLC, Mountain View, CA (US)

(72) Inventors: Dana Movshovitz-Attias, Mountain View, CA (US); John Patrick McGregor, Jr., Mountain View, CA (US); Gaurav Nemade, Mountain View, CA (US); Sujith Ravi, Santa Clara, CA (US); Jeongwoo Ko, Mountain View, CA (US); Dora Demszky, Stanford, CA (US)

(73) Assignee: GOOGLE LLC, Mountain View, CA (US)

( * ) Notice: Subject to any disclaimer, the term of this patent is extended or adjusted under 35 U.S.C. 154(b) by 224 days.

(21) Appl. No.: 17/582,206

(22) Filed: Jan. 24, 2022

(65) Prior Publication Data
US 2022/0292261 A1 Sep. 15, 2022

Related U.S. Application Data

(60) Provisional application No. 63/161,275, filed on Mar. 15, 2021.

(51) Int. Cl.
*G06F 40/289* (2020.01)
*G06F 40/30* (2020.01)
*G06N 20/00* (2019.01)

(52) U.S. Cl.
CPC ............ *G06F 40/289* (2020.01); *G06F 40/30* (2020.01); *G06N 20/00* (2019.01)

(58) Field of Classification Search
USPC ................................................ 704/1–504, 9
See application file for complete search history.

(56) References Cited

U.S. PATENT DOCUMENTS

| 8,386,265 B2 * | 2/2013 | Subramanian | ...... G10L 19/0018 704/277 |
| 10,547,574 B2 * | 1/2020 | Pham | ................... G06F 3/04842 |

(Continued)

OTHER PUBLICATIONS

Alm, Cecilia Ovesdotter , et al., "Emotions from text: machine learning for text-based emotion prediction", Proceedings of Human Language Technology Conference and Conference on Empirical Methods in Natural Language Processing (HLT/EMNLP), pp. 579-586, Vancouver, Oct. 2005.

(Continued)

*Primary Examiner* — Marcus T Riley
(74) *Attorney, Agent, or Firm* — Botus Churchill IP LAW LLP

(57) ABSTRACT

The technology relates to methods for detecting and classifying emotions in textual communication, and using this information to suggest graphical indicia such as emoji, stickers or GIFs to a user. Two main types of models are fully supervised models and few-shot models. In addition to fully supervised and few-shot models, other types of models focusing on the back-end (server) side or client (on-device) side may also be employed. Server-side models are larger-scale models that can enable higher degrees of accuracy, such as for use cases where models can be hosted on cloud servers where computational and storage resources are relatively abundant. On-device models are smaller-scale models, which enable use on resource-constrained devices such as mobile phones, smart watches or other wearables (e.g., head mounted displays), in-home devices, embedded devices, etc.

20 Claims, 21 Drawing Sheets
(16 of 21 Drawing Sheet(s) Filed in Color)

(56) References Cited

U.S. PATENT DOCUMENTS

| | | | | |
|---|---|---|---|---|
| 10,979,373 | B2* | 4/2021 | Pham | H04L 51/02 |
| 11,579,589 | B2* | 2/2023 | Geiselhart | G06F 40/20 |
| 11,829,920 | B2* | 11/2023 | Pripstein | G06F 17/18 |
| 2014/0095148 | A1* | 4/2014 | Berjikly | G06F 40/40 704/9 |
| 2014/0095149 | A1* | 4/2014 | Berjikly | G06F 40/30 704/9 |
| 2015/0254566 | A1* | 9/2015 | Chandramouli | G06N 20/10 706/11 |
| 2018/0083898 | A1* | 3/2018 | Pham | G06F 40/56 |
| 2020/0106726 | A1* | 4/2020 | Pham | G06F 40/56 |
| 2020/0160356 | A1* | 5/2020 | McCord | G10L 15/22 |
| 2022/0292261 | A1* | 9/2022 | Movshovitz-Attias | G06N 20/00 |

OTHER PUBLICATIONS

Hofmann, Jan, et al., "Appraisal Theories for Emotion Classification in Text", arXiv:2003.14155v6 [cs.CL] Nov. 3, 2020, 14 pages.

Sánchez, Francisco Luque, et al., "Revisiting crowd behaviour analysis through deep learning: Taxonomy, anomaly detection, crowd emotions, datasets, opportunities and prospects", Science Direct, Information Fusion 64 (2020) pp. 318-335.

Seo, Seungwan, et al., "Comparative Study of Deep Learning-Based Sentiment Classification", IEEEAccess, vol. 8, 2020, pp. 6861-6875.

Aman, Saima, et al., "Identifying Expressions of Emotion in Text", V. Matousek and P. Mautner (Eds): TSD 2007, LNAI 4629, pp. 196-205, 2007.

Kaliamoorthi, Prabhu, et al., "PRADO: Projection Attention Networks for Document Classification On-Device", Proceedings of the 2019 Conference on Empirical Methods in Natural Language Processing and the 9th International Joint Conference on Natural Language Processing, pp. 5012-5021, 2019.

Lei, Tao, et al., "Simple Recurrent Units for Highly Parallelizable Recurrence", arXiv:1709.02755v5, Sep. 7, 2018, pp. 1-15.

Ravi, Sujith, et al., "Self-Governing Neural Networks for On-Device Short Text Classification", Proceedings of the 2018 Conference on Empirical Methods in Natural Language Processing, pp. 887-893, 2018.

* cited by examiner

Fig. 1A
100

| Query | Prediction 1 | Prediction 2 | Prediction 3 | Prediction 4 | Prediction 5 |
|---|---|---|---|---|---|
| I love you | | | | | |
| I got the job! | | | | | |
| My dog died | | | | | |
| Let's grab a beer | | | | | |
| Feeling so sick | | | | | |
| I'm kind of sleepy | | | | | |

Fig. 1B
110

| Query | Direct predictions | | | Induced predictions | | |
|---|---|---|---|---|---|---|
| | 1 | 2 | 3 | 1 | 2 | 3 |
| Wanna grab dinner? | | | | | | |
| Ugh! | | | | | | |
| I totally nailed it! | | | | | | |

Fig. 1C

| Query | Prediction 1 | Prediction 2 | Prediction 3 | Prediction 4 | Prediction 5 |
|---|---|---|---|---|---|
| I love you | 😀 | 😀 | ❤️ | 😀😀 | ❤️ |
| I got the job! | 😀 | 🎉 | 😀😀😀 | 😀😀 | 😀😀😀 |
| My dog died | 😀 | 😢 | 😀 | 😀 | 😀 |
| Let's grab a beer | 🍺 | 👍 | ? | 😀 | 🍺 |
| Feeling so sick | 😀 | 😀 | 😀😀 | 😀 | 😀 |
| I'm kind of sleepy | 😀 | 😀😀😀 | 😀 | 😀 | 😀 |

| Query | Concept 1 | Concept 2 | Concept 3 |
|---|---|---|---|
| I love you | Love | Kiss | |
| I got the job! | Celebrating | Happy | Proud |
| My dog died | Distraught | Crying | Sad |
| Let's grab a beer | Beer | Strong | Approving |
| Feeling so sick | Sick | Distraught | Sad |
| I'm kind of sleepy | Sleepy | Distraught | Crying |

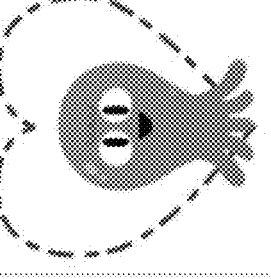

Fig. 1F  140

| Direct predictions | | | Input | Induced predictions | | |
|---|---|---|---|---|---|---|
| 1 | 2 | 3 | | 1 | 2 | 3 |
| ▽ | ☺ | ☻ | Wanna grab dinner? | 🍕 | 🍔 | 🍣 |
| ● | ● | ✿ | Ugh! | ● | ● | ● |
| ◗ | ? | ... | I totally nailed it! | ● | ☺ | ✶ |

| | Emotion emojis | | | | | | |
|---|---|---|---|---|---|---|---|
| | lmao | funniest | laughing | hilarious | laughed | weirdest | hahahahahahahaha |
| | victorious | smiles | optimistic | happiest | yaaaay | successful | blush |
| | lollol | blushing | teehee | gigging | smiling | awsome | grin |
| | wink | hint | joking | impress | charm | distraction | classy |
| | flattered | blush | joking | smiling | surprise | besties | prettiest |
| | thug | badass | coolest | activated | shades | sunglasses | sup |

Fig. 2B

| | | | Non-emotion emojis | | | | |
|---|---|---|---|---|---|---|---|
| 🫘 | coffee | cuppa | latte | espresso | cocoa | mocha | java |
| ☀ | sunshine | degrees | skies | sunny | shine | rise | marvelous |
| 💪 | strong | muscles | buff | weights | flex | workout | lifting |
| 💤 | snore | goodnite | zzz | nighty | sleepy | snooze | restful |
| 🐻 | polar | bears | teddy | pooh | cuddly | koala | snuggle |
| 🐶 | woof | bark | puppies | dog | animals | fluffy | sweetness |

| icon | | | | | | | |
|---|---|---|---|---|---|---|---|
| ☕ | coffee | cuppa | | cup of coffee | cup of tea | drinking coffee | latte | hot chocolate |
| ☀ | good morning sunshine | morning sunshine | | my sunshine | sunshine | degrees | sunny day | shining |
| 💪 | my strong look | break the chain | | best person | strong | stay strong | hit the gym | a good workout |
| 💤 | rest tonight | dreams sleep | | good night dear | nighty night | you sleep good | zzz | night dear |
| 😲 | oh snap | dude what | | wait what | omg what | wait how | whaaat | omg omg |
| 🐻 | polar bears | teddy bear | | a bear | teddy | bear | the bear | boo bear |

| Emoji token replacement |
|---|
| busy as a 🐝 |
| 🍑 bump |
| driving in my 🚗 |
| hop in the 🛩 |
| make some 💰 |
| ✈ ticket |

| Query | Follow-up prediction 1 | | Follow-up prediction 2 | | Follow-up prediction 3 | |
|---|---|---|---|---|---|---|
| you are very funny | [emoji] | [0.1925] | [emoji] | [0.1250] | [emoji] | [0.0975] |
| oh so funny | [emoji] | [0.2386] | [emoji] | [0.0846] | [emoji][emoji] | [0.0761] |
| Yes babe :) | [emoji] | [0.2846] | [emoji] | [0.1898] | [emoji] | [0.0711] |
| haha yeah kinda | [emoji] | [0.2065] | [emoji] | [0.0971] | [emoji] | [0.0773] |
| thank you so much <3 | [heart] | [0.4680] | [heart] | [0.4550] | [heart][heart][heart] | [0.0087] |
| no? why | [emoji] | [0.2290] | [emoji] | [0.0756] | [emoji] | [0.0628] |
| all good bro | [emoji] | [0.3540] | [emoji] | [0.1457] | [emoji] | [0.1032] |
| it's really good | [emoji] | [0.4458] | [emoji] | [0.1364] | [emoji] | [0.0966] |
| it's so cool | [emoji] | [0.1756] | [emoji] | [0.1418] | [emoji] | [0.1352] |
| ugh! | [emoji] | [0.0982] | [emoji] | [0.0510] | [emoji] | [0.0434] |
| Love u miss u | [emoji] | [0.0709] | [emoji] | [0.0623] | [emoji] | [0.0554] |
| omg so cute!!! | [emoji] | [0.1251] | [emoji] | [0.0664] | [emoji][emoji][emoji] | [0.0577] |

| Message | Prediction1 | Prediction2 | Prediction3 |
|---|---|---|---|
| i need to go bye | neutral | sadness | love |
| hi what are you doing | neutral | love | joy |
| im going to take a shower | neutral | joy | amusement |
| what r u up to | neutral | love | amusement |
| so what are you doing now | neutral | love | amusement |
| what are you doing tonight | neutral | love | joy |
| i meant to send this | neutral | amusement | joy |
| what r u doing now | neutral | love | anger |
| what are you guys doing | neutral | joy | amusement |
| are you going to sleep | neutral | love | sadness |
| hi how are you doing | neutral | love | joy |
| are you going to bed | neutral | love | sadness |
| hey what are you doing | neutral | love | joy |
| i have to go now bye | neutral | sadness | love |
| what are you doing tomorrow | neutral | love | joy |
| when are you going to be home | neutral | sadness | love |
| do you want to build a snowman | neutral | joy | amusement |
| did you get my message | neutral | amusement | joy |
| oops that was an accident | neutral | sadness | confusion |

METHODS FOR EMOTION CLASSIFICATION IN TEXT

CROSS-REFERENCE TO RELATED APPLICATIONS

This application claims the benefit of the filing date of U.S. Provisional Patent Application No. 63/161,275, filed Mar. 15, 2021, the entire disclosure of which is incorporated by reference herein.

BACKGROUND

There are numerous text-based methods, such as texts, chats, email, etc., that enable effective communication between the participants. The participants can choose to include emoji (emoticons), stickers, GIFs and text-based symbols to indicate how they feel about something. Products and services may try to identify such feelings and auto-suggest text or other data for a user to send or otherwise utilize based on various inputs, such as incoming messages or multi-turn dialogue sequences. However, it may be challenging to identify emotions in textual communications, especially when the sender and recipient may experience different emotions.

BRIEF SUMMARY

The technology relates to methods for detecting and classifying emotions in textual communication. Aspects include machine-learned models which can be used to enhance the participants' experience in a wide variety of text-based applications and services. The technology incorporates the following dimensions and capabilities: methods for detecting/classifying direct versus induced emotion (or point of reference); granularity of emotions; and text-length and aggregation. The point of reference aspect refers to detection of the emotion of the author, versus the emotion induced in the reader of the text. Granularity of emotions is possible through the development of a variety of emotion taxonomies, either curated ones, ones inferred from data, or ones that are both inferred and curated. Machine-learned models discussed herein support different levels of emotion granularity depending on the research and product use-case. And aspects of the technology provide emotion prediction for different length-text and aggregation methods for emotion predicted from multiple texts and resources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-C illustrate tables of emoji predictions in response to textual queries in accordance with aspects of the technology.

FIG. 1D illustrates a table of concepts associated with textual queries in accordance with aspects of the technology.

FIG. 1E illustrates a table of sticker predictions in response to textual queries in accordance with aspects of the technology.

FIG. 1F illustrates a table showing examples of direct and induced predictions associated with textual comments in accordance with aspects of the technology.

FIGS. 2A-C illustrate tables of textual results associated with emotion and non-emotion emojis in accordance with aspects of the technology.

FIG. 2D illustrates emoji token replacement in accordance with aspects of the technology.

FIG. 2E illustrates a table of follow-up predictions associated with textual queries in accordance with aspects of the technology.

FIGS. 6A-B are tables showing examples from a sticker reply model and a unified model in accordance with aspects of the technology.

FIG. 8 illustrates a table of predictions from a model trained with emotion and sentiment modeling in accordance with aspects of the technology.

DETAILED DESCRIPTION

Overview

Figure 3:
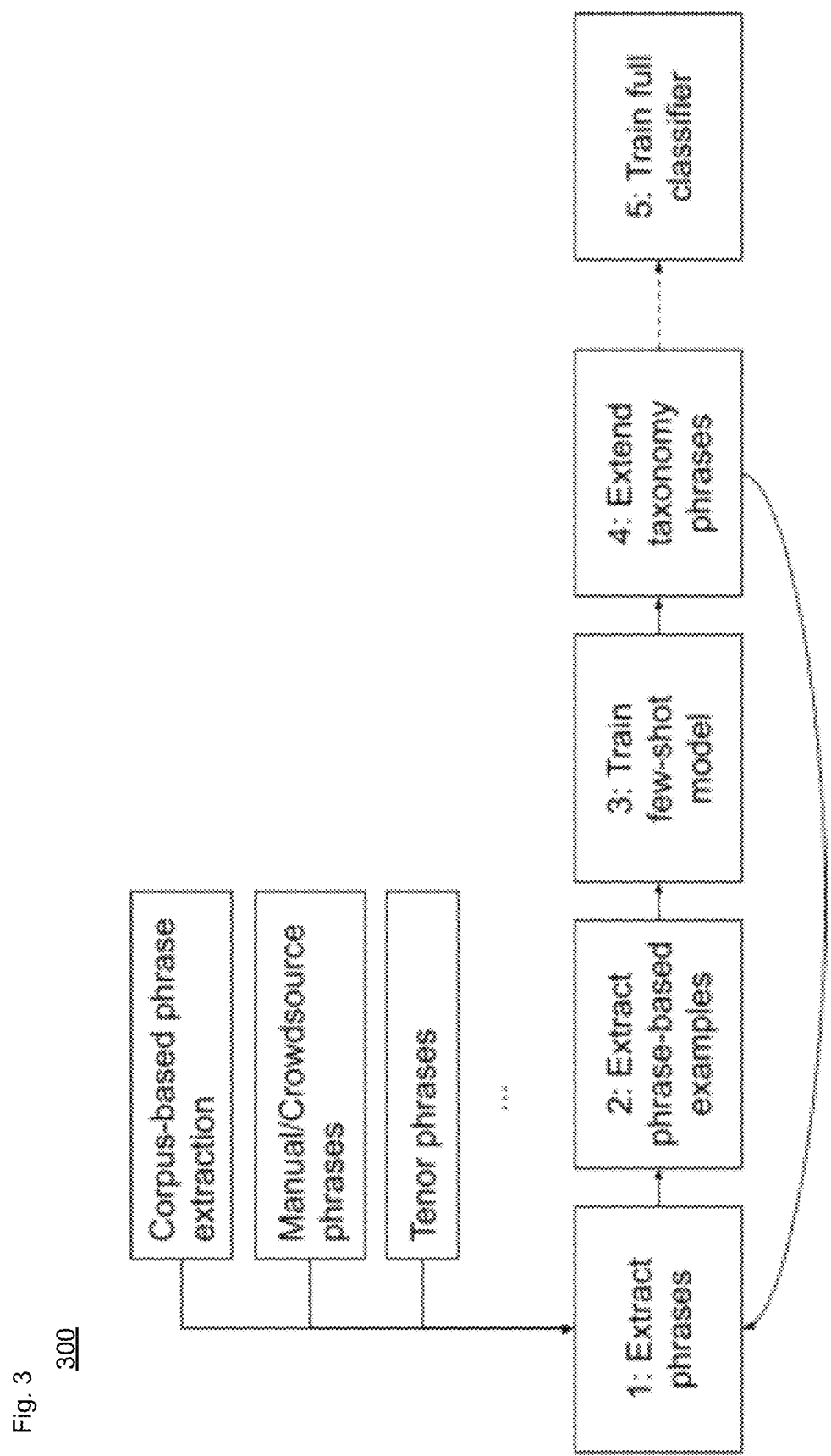
FIG. 3 is few-shot classifier training approach in accordance with aspects of the technology.

The technology provides machine-learned models (that are optionally human curated) for detecting emotion and/or granularly classifying emotions associated with sequences or collections of text. While existing "smart reply" features can be helpful, a deeper understanding and accurate identification of emotions can enrich the user experience. For instance, GIFs, stickers and/or emojis can be suggested that correspond to sender or recipient emotions with a high degree of relevancy.

Two main types of models are employed: fully supervised models and few-shot models. In the former case, an emotion is learned based on expressive features (emojis, stickers, GIFs, etc.) shared by users in the course of a conversation. This model is well suited for a corpus that contains rich expressive data, such as a chat corpus, or online commenting platforms (e.g., public commenting in response to a video or other imagery). Certain fully supervised models may be trained based on online chats. For few-shot models, emotions may be learned based on a small amount of labelled emotion-bearing phrases expressed by the author or reader. In these situations, the model may be semi-supervised and is useful for a corpus that does not include expressive data, where the required granularity of emotions is not supported by the expressive data, or as a complement to expressive data.

In addition to fully supervised and few-shot models, other types of models focusing on the back-end (server) side or client (on-device) side may also be employed. Server-side models are larger-scale models that can enable higher degrees of accuracy, such as for use cases where models can be hosted on cloud servers where computational and storage resources are relatively abundant. On-device models are smaller-scale models, which enable use on resource-constrained devices such as mobile phones, smart watches or other wearables (e.g., head mounted displays), in-home devices, embedded devices, etc.

Objectives, Approaches and Training

A goal of the technology is to detect emotion in conversational text. This can be decomposed by several aspects. First is direct vs. induced (or point of reference). This refers to detection of the emotion of a sender (speaker), versus the emotion induced by a receiver of a message. Second is fixed vs. learned emotion sets. Aspects of the technology explore both a fixed set of emotions and a set that is learned directly from the conversation context. Third is coarse-grained vs. fine-grained emotions (granularity). Much of the existing literature about emotions deals with a coarse high-level set of ~6 emotions. However, understanding a wider variety of emotions may be much more useful and enhance the utility of different applications and services.

Areas of the technology focus on learning emotion in conversational context, guided by the use of emotionally-expressive features such as emoji and stickers. Emojis may be considered to be a proxy for an expressed emotion. Multiple language models have been developed as detailed below that predict the emotionally-expressive reaction of users to messages in a conversation as well as the emotion of the sender.

Models may be trained based on different data sets, which may focus on different types of applications or services. A high-level data processing pipeline is as follows. Given a conversation, construct training examples that include (i) an input message and (ii) a target emotion. The type of input depends on the task, as described in the model sections below. A proxy for the target emotion may be an emoji, GIF or sticker shared in the conversation. The raw example data may be filtered examples to keep only frequent tokens, e.g., a set of 3-10 tokens, or more or less. For each model, the system maintains a dictionary of supported tokens and emotion categories. Note that the set of supported classes may be application dependent. Some models may support the set of most frequent emojis (including sequences), high-level emotion concept categories, or emojis, stickers and/or GIFs restricted to a specific requested set.

Language models have been developed for direct and induced user emotion, based on items such as emojis and stickers used in chat conversations. In one example, the system supports emoji predictions beyond the set of emotion-expressing emoji. However, for the relevant queries, an emotion-concept prediction may be based on emotion-expressing emojis.

Direct Emotion

For direct emotion, there is interest in predicting the emotion of a user based on the messages she sends in a conversation. This scenario may be modeled by emotionally-expressive features (e.g., emoji, stickers, GIFs or other graphical elements) that follow up a user's message. Given a conversation, training examples are constructed by searching for messages that were immediately followed up by a graphical element by the same user. Training examples include (i) input messages and (ii) target emotions. An input message is the message that immediately preceded the graphical element. The target emotion is the graphical element as a representative of the expressed emotion.

Table 100 of FIG. 1A shows an example of the top 5 predicted emojis to sample input messages. Unlike the induced-emotion predictions shown above, here, the predictions represent the emotion of the sender. The direct-emotion predictions to the examples shown in table 100 may be very similar to the induced-emotion predictions. This is not surprising as people are empathetic, and tend to mimic the emotion they interpret in others.

Table 110 of FIG. 1B illustrates a few examples where the difference between direct and induced emotions are more pronounced than the example of FIG. 1A. Here, there are three queries as shown in the leftmost column of the table: "Wanna grab dinner?"; "Ugh!"; and "I totally nailed it!". In this scenario, the direct emotion revolves mainly about happiness, whereas the response is concerned with an approval of the suggestions. When the sender is expressing anger or disappointment, in response, the receiver is sad and crying. The direct emotion that can be deduced here is about self-pride and strength, whereas the response is much more concerned with celebration.

Induced Emotion

For induced emotion, the system focuses on predicting the emotional response of users, based on a conversation they participate in. This scenario may be modeled by the emotionally-expressive response of a user to an incoming message/conversation. Given a conversation, training examples may be constructed by searching for messages that were replied to by an emoji/sticker or other graphical element (either as the only reply, or as the beginning of the reply). Training examples include (i) an input message (the conversation context that preceded the emoji/sticker or other graphical element) and (ii) a target emotion (where the emoji/sticker or other graphical element acts as a representative of the expressed emotion. The next table 120 of FIG. 1C shows the top 5 predicted reply-emojis (including sequences) to sample input messages.

According to one aspect, each of the emoji classes is mapped to a fixed set of emotion concepts (or non-emotion concepts for object emojis). Based on the top predictions, the system also returns the high-level concepts of induced-response associated with the query. For example, the query "I got the job!" elicits the response emotion "Proud", as shown in table 120 of FIG. 1D. Table 130 of FIG. 1E shows the results of a trained model suggesting stickers as a response with three different predictions for each sample query.

Table 140 of FIG. 1F considers a few examples where the differences between direct and induced emotions are more pronounced. For instance, with the phrase "Wanna grab dinner?", the direct emotion revolves mainly about happiness, whereas the response is concerned with an approval of the suggestions. For "Ugh!", the sender is expressing anger or disappointment, and in response, the receiver is sad and crying. And for "I totally nailed it!", the direct emotion that can be deduced here is about self-pride and strength, whereas the response is much more concerned with celebration.

Given a conversation, training examples are constructed that include an input message and a target emotion. The type of input depends on the task. The proxy for the emotion may be, e.g., an emoji or sticker shared in the conversation. The raw examples are filtered to keep only frequent tokens. Tokens can include any text in the input, including emojis. For each model, a dictionary of supported tokens and emotion categories is maintained, stored in memory. The set of supported classes is application dependent. Some models may support the set of most frequent emojis (including sequences of emojis), high-level emotion concept categories, or emojis/stickers or other graphical elements restricted to a specific requested set.

Context Keyword Extraction

In one scenario for the examples described above, a manual mapping between emojis and a fixed set of concepts could be employed. These concepts include emotions (e.g., happy, sad, proud, etc.) as well as other categories that can be used to describe emoji/stickers or other graphical elements (e.g., beer, strong, etc.). However, in other scenarios it may be more beneficial to extract the concept/emotion that is best associated with emojis directly from the data.

Concepts can be extracted as keywords that appear in the vicinity of the emoji or other graphical element in the text. Keywords may be extracted according to the following pipeline. Keywords are extracted based on training examples from the direct-emotion prediction model. This means that the text is assumed to directly be associated with the target emotion. N-grams are extracted from the input messages in the examples. For each target class (emoji/sticker or other graphical element), keep as keywords the top n-grams (e.g., the top 2-5 n-grams), using pointwise mutual information (PMI). Optionally filter keywords that contain "bad" words, according to a bad words classifier. In addition or alternatively, the system may filter out first names, which seems to appear frequently in the extracted keywords.

Keyword examples from a direct model may include, for instance: (i) coffee, cuppa, cup of coffee, cup of tea, drinking coffee, latte, espresso, sipping, casual, cocoa, a coffeehouse name, java, creamer or mocha associated with ☕; (ii) good morning sunshine, morning sunshine, my sunshine, sunshine, degrees, sunny day or shining associated with ☀; (iii) my strong look, break the chain, best person, strong, stay strong, hit the gym, a good workout, be strong, muscles, good workout, buff, gym tonight and workout are associated with 💪; (iv) rest tonight, dreams sleep, good night dear, nighty night, you sleep good, zzz, night dear and getting sleepy are associated with 😴; (v) oh snap, dude what, wait what, omg what, wait how, whaat, and omg omg are associated with 😮; (vi) and polar bears, teddy bear, a bear, teddy, bear, the bear, boo bear, gummy, pooh, cuddly, koala and cubs are associated with 🐻.

Examples of unigram emojis are found in tables 200 (emotion emojis) and 210 (non-emotion emojis) of FIGS. 2A and 2B, respectively. Table 200 shows examples of unigram keywords extracted for emojis that do represent some emotion, while table 210 shows examples of unigram keyword that do not represent some emotion.

Many of the keywords for the emotion-emojis indeed convey an emotion, feeling, or an emotional reaction, including: laughing, blushing, victorious, coolest, flattered, etc. Some of the extracted keywords are significantly different from the set of concepts that may be defined manually (e.g., thug, grin); however, they do capture a relevant (albeit informal) way of describing an emotion that can be conveyed by the emoji.

The keywords associated with non-emotion emojis, often describe a noun that can be associated with the emoji (e.g., coffee, bears, muscles, dog, etc.). Many describe relevant conversational phrases (e.g., nighty or goodnight). Interestingly, despite the fact that these emojis are not obviously associated with a specific emotion, some of the keywords extracted for them can be used to convey a relevant emotion or feeling (e.g., marvelous for ✨, strong for 💪, or sleepy for 😴).

Trigram Keywords

In the examples as shown in table 220 of FIG. 2C, up to tri-gram keywords were extracted for emojis. These contain many more conversational phrases. Notably, some of these phrases include creative and interesting ways to describe emotions. For instance, the "Surprise" emotion is conversationally described by phrases including "oh snap", "wait how", and "omg omg".

Applicability

Keyword extraction can be applicable for multiple scenarios. For instance, keywords can be used as a diverse way of describing emotions, which goes beyond the traditional definitions, and might be more appropriate for conversational understanding. Keywords can be used as a mediating step for emoji, sticker, or emotion prediction. This approach can be helpful, in part, for predicting rarely used emojis, based on conversational phrases that are strongly associated with them (even though these may be rare). And keywords can be used for direct token replacement in keyboard models. For instance, table 230 of FIG. 2D shows phrases where a token in the sentence has been replaced with one of its high PMI keywords.

Evaluation

In one example, the accuracy of the emotion prediction models was evaluated on a selected test corpus involving a videoconferencing system. The results are summarized below in Table I:

| Accuracy | Direct model | Frequency of top directed classes | Induced model | Frequency of top induced classes |
|---|---|---|---|---|
| @1 | 27% | 11% | 18% | 9% |
| @5 | 60% | 39% | 43% | 34% |
| @10 | 76% | 61% | 59% | 50% |

Note that in this evaluation, the emoji predicted by the emotion models is compared against the exact emoji shared by the users in the conversation, making this a particularly difficult prediction task. For example, for the message "Just returned from a fantastic vacation!" followed by 😊, there can be many predictions which exhibit a similar emotion, including 😊, 😄, 😃, etc. In one scenario, the system may only measure the ability to predict the exact shared emoji. In another aspect, the system may additionally compare the accuracy of the direct and induced models to the frequency of the top classes in each dataset. The results show that the model has significantly higher accuracy than a model predicting only the most frequent classes.

Sentiment Analysis

One question is whether emotion classifiers can be used as sentiment classifiers. This can be accomplished by mapping emotion classes to positive and negative sentiments. Some things to consider include the following. Some emotions are not clearly positive/negative. This can potentially be disambiguated by the second/third prediction. For example, astonished can have both a positive/negative tone, but then the following predictions may be happy or angry, which gives the system a further understanding of the prediction. Sarcasm, such as a phrase like "that's just great", will generally give a positive prediction (Happy, Approving), but may be said in a sarcastic tone, indicating a negative emotion. Many sarcastic predictions could be missed by certain models, since sarcasm may not often be used in personal conversations. Some expressions can be said with either a positive or negative tone, for example: "I'm staying home today". The more likely interpretation here is positive, but there is a negative prediction that's not very unlikely (though may be not in the top 3 interpretations). In some cases, a sentence could have both "Happy" and "Sad" in the top predictions, and this means the model may be missing context to predict anything more precise.

Sensitive Context and Negative/Positive Emotion Prediction

Emotion-based predictions can be sensitive. For instance, one goal for an app or service is to delight users, but also avoid negatively affecting them. Thus, if an incoming message states "I was in an accident", the system may use sensitive context classifiers to suppress user-facing smart reply predictions in an app.

In an analysis of curated video comments, a prediction of sensitive comments and comments was compared with negative/positive emotion prediction. The goal of this analysis was to evaluate whether negative-emotion comments correlate with sensitive content and, likewise, positive-comments correlate with non-sensitive content in comments. A conclusion from this analysis was that a conventional sensitive content classifier does not correlate satisfactorily with negative-emotion prediction.

A few observations can be drawn from this analysis. First, some emotions are not inherently positive/negative. For example, Astonished can have both a positive/negative tone, so I used the second/third top predicted emotions to get a hint of whether the tone is positive/negative. A sensitive classifier in accordance with aspects of the technology is trained to pick up on things like swear words. So while a comment can be genuinely positive, it might contain swear words, which means the system could classify it as sensitive. The sensitive content classifier can be re-trained to ignore swear words, but then may not be expected to align only with negative emotions. Swear words are only one example of this issue. Another example is that a system may also pick up on a variety of medical/religious/political terms, which are not always discussed in a negative tone. Finally, sarcasm in general is hard to detect, but it also means that something can be said in a sarcastic/joking tone, while being classified as sensitive for other reasons.

Append Emoji Predictions for Conversational Smart-Reply Predictions

Using a direct-emotion model, in one example the system predicted follow-up emojis for a large set of messages (on the order of 30,000+ messages) in an English-language whitelist for an existing instant messaging mobile app that employed smart-reply. Highlighted examples for the predicted follow-up emojis are shown in table 240 of FIG. 2E.

Few-Shot Emotion Prediction

As noted above, one aspect of the technology employs fully supervised models and few-shot models. This section describes a few-shot approach towards emotion prediction that is based on emotion bearing phrases. This extends the expressive-content-based approach, which relies on in-conversation sharing of expressive content (e.g., emojis, stickers). There are a couple of limitations of an expressive-content approach, including being limited to conversational data in some scenarios, and data bias and coverage restrictions. Data bias and coverage restrictions may be due to conversations/turns where expressive content is shared. This affects both the type of examples the models see, as well as the breadth of potential labels.

Here, a few-shot approach to emotion prediction is based on the identification of few emotion-bearing phrases, per learned category. The goal is to learn a reliable low-coverage few-shot classifier, which can be expanded over time as more labelled data becomes available. The few-shot approach allows exploring a variety of new labels across many domains, and to adapt the model to multiple interpretations of "emotions". This approach provides multiple advantages over an expressive-content-based approach, including generalizability across all-domain text corpora, and taxonomy coverage beyond the scope of expressive content.

FIG. 3 illustrates a few-shot classifier training approach 300. This approach is broken out into several phases. Phase 1 is phrase extraction. This stage extracts salient phrases that represent and expands on each taxonomy concept. For example, "happiness" can be extended with phrases like "joy", "feeling happy", "so good". Sources for emotion-bearing phrases can include: corpus-based phrases, manual/crowdsourced phrases and/or tenor phrases. For corpus-based phrases, the system extracts phrases based on their interaction with concepts in a given corpus. For manual/crowdsource phrases, the system includes phrases found by a human to be emotion-bearing. And for tenor phrases, the system includes popular phrases used to extract GIFs (or other graphical elements). Alternatives here can include manual review of extracted phrases and/or to bias extracted phrases towards a "high-quality" set. For example, extracting phrases based on salient-terms can be more useful than inferring phrases directly from a corpus.

Phase 2 is extraction of phrase-based examples. Here, the system finds examples which are based on emotion-bearing phrases. The goal is to identify emotion-bearing text based on the phrases found in phase 1, and learn to classify these messages. Different approaches here could be exact or partial matching, and/or classification of emotion-bearing text. For an exact or partial match, the system extracts examples with an exact or partial match with the input phrases. This gives a high-recall and low precision set of examples. Classifying emotion-bearing text involves training a classifier, or otherwise evaluating the semantic distance of the tested text with the emotion phrases identified in phase 1.

Phase 3 is training the few-shot model. In particular, this phase involves training a model based on phrase-bearing examples. This model should also take into account emotion-neutral statements. This could be the final phase, although additional phases may enhance system operation. Phase 4 involves (optionally) extending the taxonomy of phrases. Here, given additional data and human-labelling resources, the system can improve the steps above, for example by improved identification of emotion-bearing phrases, and/or extending emotion taxonomy (for example, identify emotion-bearing phrases for new emotion concepts). And phase 5 is training the full classifier. Here, the system can treat the few-shot classifier as a "golden" classifier, use it to weakly-label a full corpus, and train a more complex supervised classifier over that corpus (if that is not possible in step 3 above).

In one scenario, a few-shot emotion prediction ML model may include extracting phrases with high PMI between n-gram and concept from the example training corpus of the expressive-content classifier. The output n-grams may be manually reviewed for all emotion concepts. A subset of phrases, e.g., up to 10 phrases per concept, may be selected from the automatically extracted phrases. Next, concepts for which no strong phrases were found in the extracted set can be removed. This can indicate that the examples to the expressive-content classifier don't contain good discriminative data for this concept. Similar categories may then be renamed, or misnamed categories can be renamed (according to the extracted phrases). Alternatively or additionally, any other categories could be added at this point. For instance, an example of a missing category may be "grief". In one example, the result is a final set of emotion categories such as one or more of: admiration, amusement, anger, anticipation, approval, boredom, celebration, confusion, disapproval, disgust, embarrassment, fear, heartbroken, indifference, innocence, joy, love, nerdy, nervousness, optimism, sadness, serenity, surprise, and/or thankful.

Based on the seeds collected in phase 1, the seed set may be expanded over a common messages set. This may be done for a particular application, such as a videoconference, chat or texting app. The graph is based on n-gram containment relationships. This can be improved to include embedding based edges for message-message, message-feature, and feature-feature pairs. The top N features may be extracted per concept. This can be optimized depending on the target model size. By way of example, N may be on the order of 1,000 to 10,000 features.

On-Device Models

Back-end (e.g., cloud-based) servers and systems can process a corpus of information based on the various approaches described herein using very large training data sets. Another aspect of the technology involves the implementation of on-device emotion models for conversational text. This can be decomposed by two aspects: direct vs. induced (or point of reference), and coarse-grained emotions vs. fine-grained emotions (granularity). The point of reference, as noted above, refers to detection of the emotion of a sender (speaker), versus the emotion induced by a receiver of a message. For granularity, it is noted that much of the literature about emotions deals with a high-level set of 8 emotions: joy, trust, fear, surprise, sadness, disgust, anger, and anticipation. These emotions can be used to predict more fine-grained emotions based on Plutchik's Wheel of Emotions.

One area of interest for on-device models focuses on building the on-device unified emotion model in a conversational context, guided by the use of emotionally-expressive features such as emoji and stickers (or other graphical indicia). Graphical indicia such as emojis and stickers are used as a proxy for an expressed emotion. On-device models have been developed that predict the emotionally-expressive reaction of users to messages in a conversation as well as the emotion of the sender.

An example data preparation pipeline is as follows. Given a conversation, construct training examples that include an input message and a target emotion. The type of input message depends on the task, as described in the model sections herein. For the target emotion, the proxy for the emotion is usually an emoji or sticker (or other graphical indicia) shared in the conversation. The raw examples may be filtered to keep only frequent tokens (e.g., the top 5, 10, 100 or 1,000 most frequent tokens). For each model, a dictionary is maintained in memory of supported tokens and emotion categories. The set of supported classes is application dependent. Some models may support the set of most frequent emojis or other graphical indicia (including sequences), high-level emotion concept categories, or emojis/stickers restricted to a specific requested set. An example of an on-device model that augments messages with emojis is shows in Table II.

TABLE II augmented on-device model

| Message | Server Model | On-Device Model | Augmented On-Device Model |
| --- | --- | --- | --- |
| cool, let me know when | Will do I'm free now | Will do Sure thing | Will do 😊 Sure thing 👍 |
| you have time can i trouble u for a moment? | Are you free now? Sure Yes What's up? | Okay, will do Sure No Yes | Okay, will do 😊 Sure 👍 No Yes |
| any chance ur free tonight | What time? Yes Yes I am | Sure What time? No | Sure What time? 😊 No |
| Any news? | Not yet Nothing yet No word yet | Not yet Nothing yet Nope | Not yet Nothing yet Nope 🙁 |
| are you going to matt's party on Sunday? | Yes I think so No | I think so I don't think so I'm not sure | I think so 😊 I don't think so I'm not sure 🤷 |

Figure 4A:
FIGS. 4A-C illustrate how multiple graphical indicia can map to a single concept, in accordance with aspects of the technology.
Figure 4B:

As can be seen in view 400 of FIG. 4A ("crying") and view 410 of FIG. 4B ("laughing"), more than one emoji and sticker can have the same concepts. To combine these emojis and stickers into a concept, in one scenario the top 1000 emojis and top 1000 stickers are reviewed (e.g., manually). From these, the concepts are generated. For instance, in one example 160 concepts may be generated based on the top 1,000 emojis and top 1,000 stickers. In this scenario, there are 3 types of concepts: emotion, entity and action. The emotion may include: happy, angry, awesome, confused, scared, crying, silly, . . . . The entity may include: birthday cake, coffee, gift, music, flower. And the action may include: wink, hi five, call me, dancing. In other scenarios, the concepts from emojis and stickers (and/or other graphical indicia) may be combined.

Product-Specific Mapping

Figure 4C:
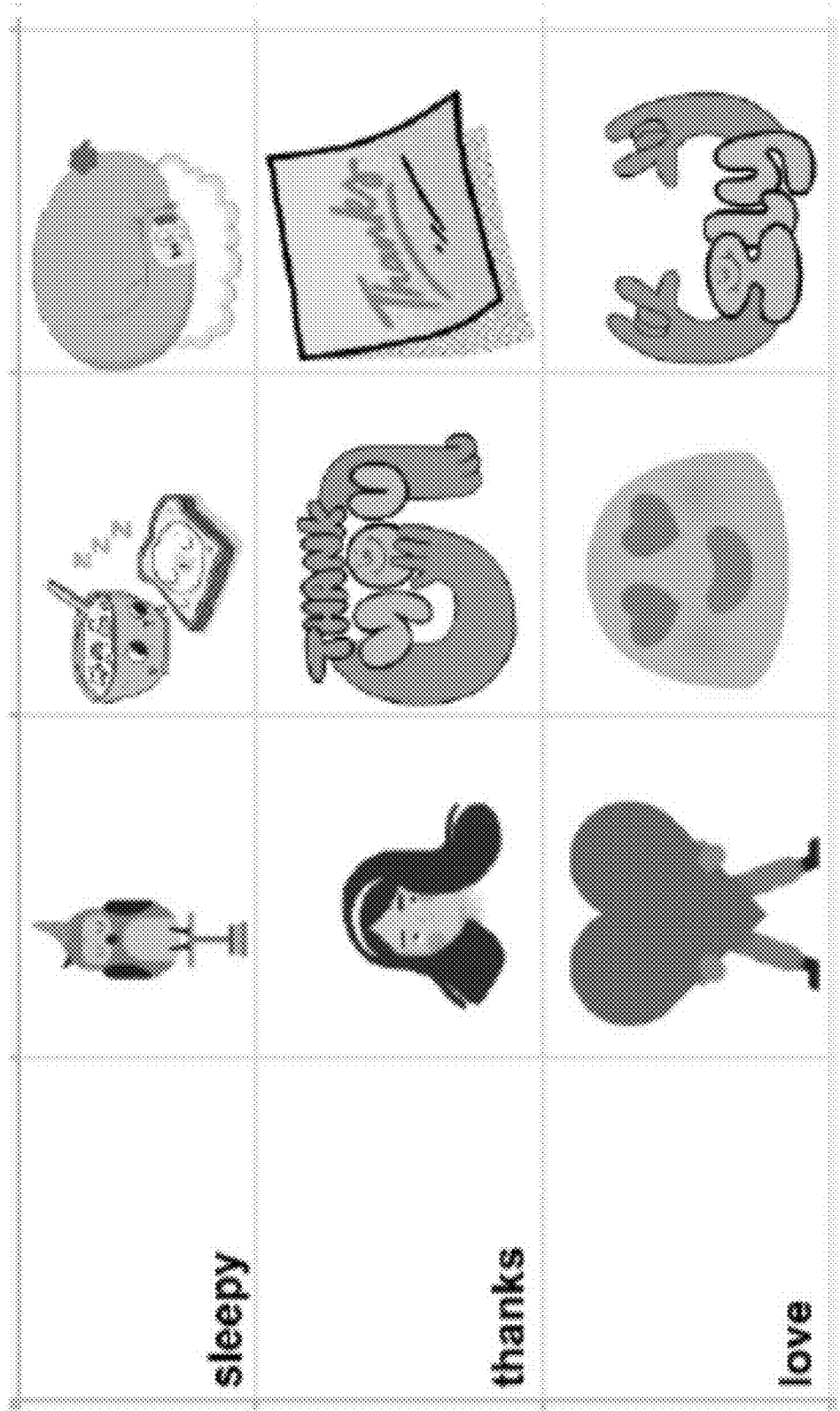

In one scenario, the model is trained using a corpus associated with a specific application or other product (such as a videoconference or chat application), but different products may have different set of stickers and emojis. For example, Google's Android Messages has its own set of stickers. As the model predicts a concept, the app (e.g., Android Messages) define its own mapping and can show different stickers for the concept based on user context and preference. For instance, view 400 of FIG. 4C illustrates product-specific mapping from concepts to stickers for the given app (e.g., Android Messages).

Figures 5A, 5B:
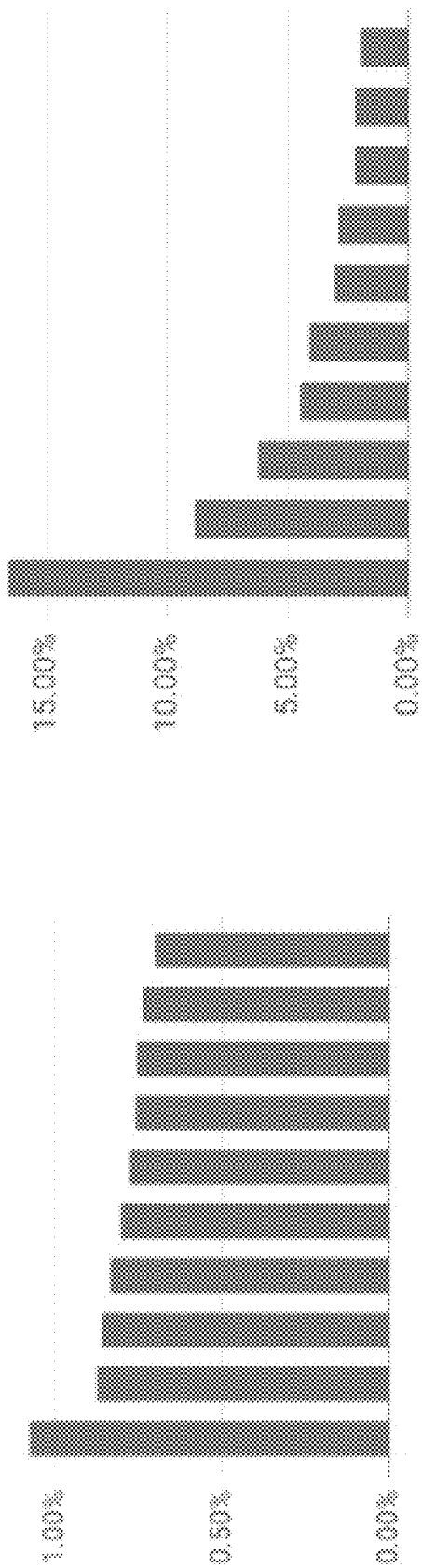
FIGS. 5A-B are charts showing example distributions of a top set of stickers and a top set of concepts in accordance with aspects of the technology.

Learning from concept may introduce a new challenge. For instance, FIGS. 5A and 5B are charts showing an example distribution of the top 10 stickers (view 500) versus the distribution of top 10 concepts (view 510) in one scenario. As can be seen, the concepts chart has skewed distribution. In this example, the top concept (e.g., love) was much more popular than the other concepts. One way to address this issue is to apply undersampling of top concepts and post-processing to adjust the prediction score based on the prior.

In one scenario, on-device models for direct and induced user emotion were developed based on emojis and stickers used in chat conversations. According to one aspect of the technology, Self-Governing Neural Networks (SGNNs) or Quasi Recurrent Neural Networks (QRNN), such as projection-based QRNNs (pQRNNs), may be used for on-device modeling. Such neural networks provide a fast and efficient model that directly computes language projection vectors using locality sensitive hashing and does not need large pre-trained word embeddings or vocabulary pruning. The model may be trained for emotion classification and converted to a TensorFlow Lite (tflite) model, which can be used for on-device prediction. While a SGNN or pQRNN may be particularly suitable for on-device modeling, other neural network approaches may be employed.

Induced-Emotion Prediction (Aka, Reply Models)

For on-device models, it may be of interest to predict the emotional response of users based on a conversation they participate in. This scenario may be modeled by the emotionally-expressive response of a user to an incoming message/conversation. For instance, given a conversation, training examples may be constructed by searching for messages that were replied to by an emoji/sticker (either as the only reply, or as the beginning of the reply). Training examples include: (i) input message—the conversation context that preceded the emoji/sticker, and (ii) target emotion—the emoji/sticker as a representative of the expressed emotion.

Direct-Emotion Prediction (Aka, Auto-Complete Models)

Here, it may be of interest to predict the emotion of a user based on the messages she sends in a conversation. This scenario may be modeled by emotionally-expressive features (emoji/stickers) that follow up a user's message. For instance, given a conversation, training examples may be constructed by searching for messages that were immediately followed up by an emoji/sticker by the same user. Training examples include: (i) input message—the message that immediately preceded the emoji/sticker, and (ii) target emotion—the emoji/sticker as a representative of the expressed emotion.

According to one experiment for an induced emotion model, the accuracy of the emotion prediction models on a selected corpus was evaluated. The results of the experiment are summarized in Tables III and IV below

TABLE III

Model to predict stickers

| Model | Model Size | Accuracy | Latency on Client Device |
|---|---|---|---|
| Network (cloud) | 16 MB | @1: 20.5%<br>@3: 37.4%<br>@5: 45.4% | N/A |
| On-device | 532 KB | @1: 20.1%<br>@3: 37.3%<br>@5: 45.9% | 2.3 milliseconds per message |

TABLE IV

Unified model for both emojis and stickers

| Model | Model Size | Accuracy | Latency on Client Device |
|---|---|---|---|
| Network (cloud) | 20 MB | @1: 33.4%<br>@3: 58.1%<br>@5: 67.5% | N/A |
| On-device | 240 KB | @1: 31%<br>@3: 56.2%<br>@5: 67% | 2.3 milliseconds per message |

Note that in this evaluation, the concept predicted by the emotion models is compared against the concept of the exact emoji or sticker shared by the users in the conversation. For example, for the message "Just returned from a fantastic vacation!" replied by ☺ ), this is taken as the concept "joy". If the model predicts "joy" as the output, it is considered to be the correct prediction.

Figure 6A:
Figure 6B:
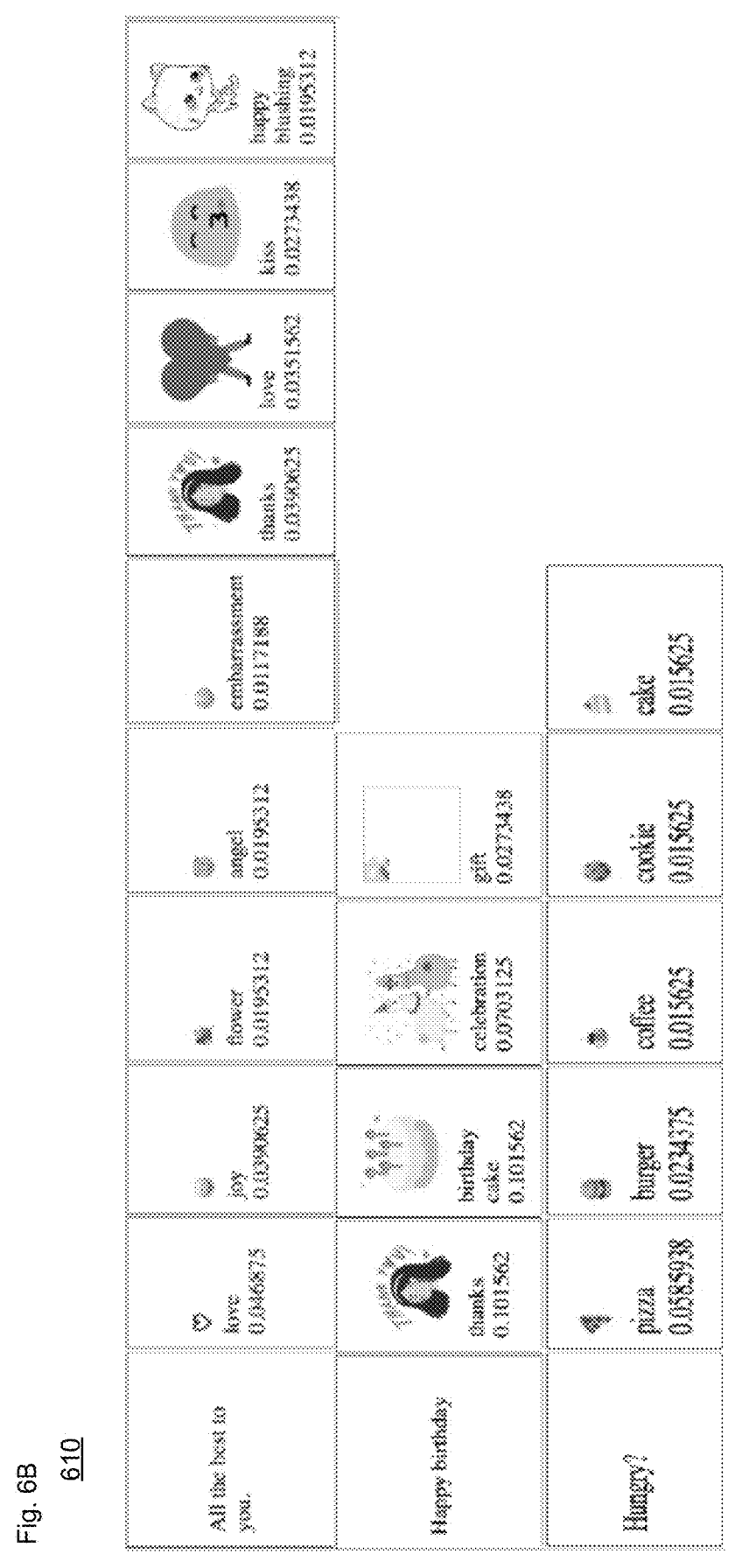

View 600 of FIG. 6A shows the examples from a side by side (SxS) comparison on the sticker reply model. The sticker reply model predicts a list of concepts for an input message. Then a sticker is chosen from the list of stickers for a concept used in a given application or product (e.g., Android Messages). For example, for the "thanks" concept, it can be seen that two different stickers were used (one having a value of 0.195312 beneath it, and the other having a value of 0.0351562 beneath it, where the values are confidences score for the predicted output, which are decimal numbers between 0 and 1 that can be interpreted as a percentage of confidence.). This will easily support the personalization by suggesting stickers the user prefers. View 610 of FIG. 6B shows the SxS examples from the combined model. The combined model may suggest both emojis and stickers (see top row), but sometimes only emojis or stickers (see bottom row).

Natural Language Emotion APL Applications and Other Services

Understanding the emotional content of text can provide valuable insights about users or the content, especially in areas such as customer feedback, reviews, customer support, and product branding. A natural language emotion API may be employed in accordance with aspects of the technology to classify text by emotions such as joy, amusement, gratitude, surprise, disapproval, sadness, anger, and confusion. For instance, an emotion API is valuable for understanding granular-level sentiment beyond just positive or negative. Potential applications can be useful across diverse set of industries & functions, including: (i) User Feedback & Reviews, in order to understand user emotions through text expressed in forms, surveys, reviews, or other means; (ii) Social listening, to understand audience's emotions about products or services by evaluating a stream of web data from sources such as Twitter, Reddit, YouTube, or more; (iii) Customer service, to evaluate user experience from customer service channels such as chat support; (iv) Marketing & branding, to understand how the target audience perceives a particular brand campaign, website, and other branding content; and (v) Expressive content, to surface expressive content to the user (e.g., GIFs, stickers, and emojis for chat apps).

Inputs and outputs for the emotion API may include the following features. Text input should, in many examples, be on the order of no more than 25-30 words. If the text is longer, it can be broken into shorter segments. The output is a set of prediction scores corresponding to each of the emotions of interest (e.g., joy, amusement, gratitude, surprise, disapproval, sadness, anger, and confusion).

API users (e.g., application developers or service providers) may have to evaluate the prediction scores for emotions and adjust thresholds for their specific use cases. For instance, users may choose a higher threshold for applications where precision is important, and lower threshold for cases that need higher recall. The threshold may be initially selected by evaluating the $F_1$ score computed with the model precision and recall.

In one example, the API has been designed to work for texts with <=30 words. The most effective prediction results are seen at a sentence level, but the models can predict emotions over a few sentences as well, as long as the total number of words is <=30. In the case of long paragraphs, the approach can involve: (1) break the paragraphs at sentence level and query the model for each sentence, and (2) for long sentences, break the sentence at 30 words (or more or less) and average the prediction results.

According to another aspect, in addition to natural language emotion detection, the approached described herein can be used with expressive content predictions, text message auto-augmentation (e.g., with emojis, stickers or GIFs), emotion detection in application comments (e.g., YouTube comments or the like), speech+text emotion detection (multimodal speech detection), as well as other applications and services.

Joint Emotion and Sentiment Model

According to another aspect of the technology, a joint emotion and sentiment model is provided. While separate models for predicting emotions from text and predicting the sentiment of an input text (e.g., in the range of [−1 (negative), 1 (positive)] may be used, the predictions from both models are highly correlated and can benefit each-other. Thus, an emotion model may be employed that incorporates the sentiment signal. The emotion signal is based on (1) expressive content shared in a conversation (e.g., emoji/sticker), and (2) emotion-bearing phrases, such as "love you", "I'm mad", etc. In contrast, the sentiment signal may be derived from (1) star rating or other approval indicia, and (2) human labels.

There are numerous benefits and goals for a joint emotion+sentiment model. The approaches described below may each address as many of these goals as possible, but some are only able to capture a subset of them. One benefit is improving the emotion model. Employing a sentiment signal can contribute to enhancing the emotion model predictions. Another benefit is modelling neutral statements. The emotion model may not be directly trained on neutral statements, but only on statements where an emotion was indicated in the data (using expressive features). Emotion predictions may be improved by either directly or indirectly taking emotional-neutrality into account. Yet another benefit is identifying the intensity of emotions. The sentiment polarity found in a sentence can be indicative and correlated with the intensity of the expressed emotion. This has the potential to unify an approach that involves a Plutchik-based emotion classification model with a Valence & Arousal approach where the valence and arousal of an emotion are explicitly stated.

Emotion-neutrality can be different from sentiment-neutrality. For example, one may consider "are you on your way?" a sentiment-neutral sentence (as it does not express a positive or negative sentiment), but depending on the context, it can be associated with emotions such as confusion, or even anger. In one example where the sentiment model is not trained on conversational data, it can produce noisy results in this domain. The following examples shown in Table V give near-neutral sentiment scores, whereas they clearly do carry both a sentiment and emotion signal.

TABLE V

| Example | Sentiment Model Score | Emotional Accuracy Prediction |
| --- | --- | --- |
| "I am mad" | 0.00 | Anger |
| "congrats!" | 0.18 | Joy, Celebration |

Figure 7B:
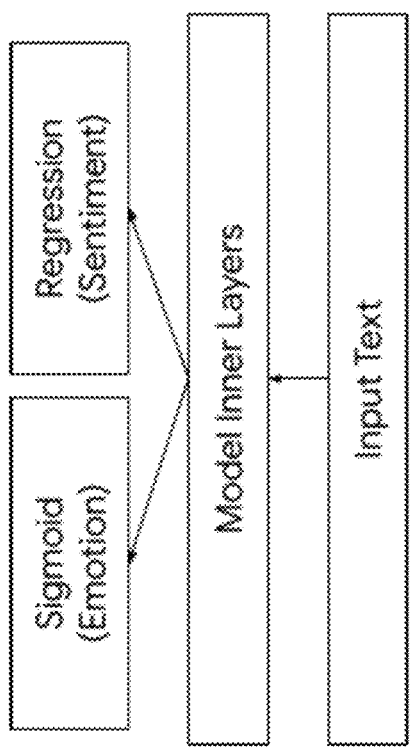
FIGS. 7A-C illustrate example processes for modeling emotion and sentiment, in accordance with aspects of the technology.
Figure 7A:
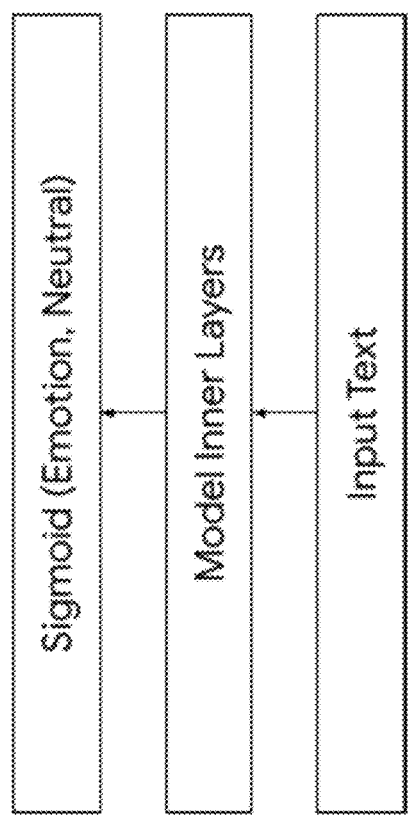

One example of modeling neutral statements (in addition to the emotion in statements) in a joint emotion+sentiment model introduces "neutral" as an additional label for the model. FIG. 7A illustrates a flow 700, in which input text is applied to the inner layers of the model, with a sigmoid output of both Emotion and Neutral labels.

This example model does not fully preserve the sentiment signal. Only the Neutral portion of the sentiment score is used, and the threshold for what that portion entails may need to be evaluated and adjusted (e.g., manually) as the underlying sentiment model changes. In this model, the Neutral label is learned independently of the emotion labels (other than sharing parameters in inner model layers).

Another approach would use the full spectrum of sentiment signal and allow it to more directly influence the emotion classification. FIG. 7B illustrates a flow 710, which provides multi-head emotion and sentiment. This model uses the full power of both emotion and sentiment signals. However, in one example the two signals are trained somewhat independently (though they are sharing internal parameters). In this case, the sentiment model does not directly inform the emotion prediction, magnitude, or model valence/arousal. The final decision on how to combine the emotion and sentiment signals (for example, in the case of neutral statements) may be selected by the user of the model (e.g., app developer), rather than be resolved in the model itself.

Figure 7C:
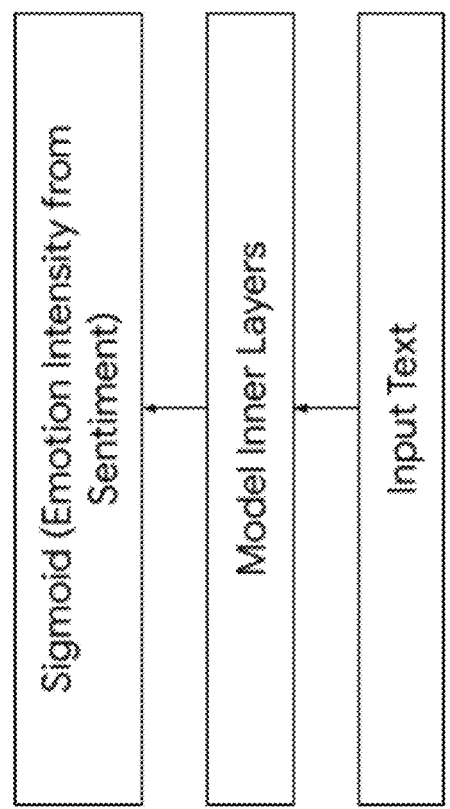

A further approach models emotion intensity using sentiment, as shown in flow 720 of FIG. 7C. This model uses the absolute magnitude of the sentiment score to indicate the intensity of the emotion detected by the emotion model. In this approach, the intensity of an emotion would be determined by the sentiment. For example, for "I love you", the emotion model predicts LOVE, and the sentiment score is 0.85, meaning that this would be learned as an intensity of 0.85. However, in the formulation stated above (sigmoid over emotions), the intensity is actually treated as confidence in the label, so this modelling approach may not be appropriate in certain situations.

Neutral Emotion Text Detection

As noted above, neutral statements may affect how emotion classification is performed (see, e.g., non-emotion emojis as shown in FIG. 2B). Thus, one aspect of the technology involves detecting neutral emotional text and build emotion models that can predict emotions only for emotional text and avoid predicting emotions for non-emotional text. In one example, emotion models are trained in conversational context, guided by the use of emotionally-expressive features such as emoji and stickers, or other graphical elements/indicia. Note that while emojis/stickers may be considered as a proxy for an expressed emotion, this does not always align well with emotion, because users tend to use emojis/stickers even for non-emotional text. Two examples of emojis used on non-emotional text are: (i) call me when you can ☺, and (ii) do you want to build a snowman ☺.

Models learned with this data predict emotions (e.g., "joy") even for these non-emotional texts. To avoid this potential issue, the system can differentiate non-emotional text from emotional text. To identify non-emotional text, a sentiment model may be used that predicts the sentiment of a text (positive, negative or neutral). In one scenario, given a conversation, training examples are constructed that include a target emotion (the proxy for the emotion is usually an emoji or sticker shared in the conversation). To identify neutral emotional text, for each message, extract the sentiment containing the magnitude and polarity of text. Magnitude is a positive number representing the total intensity of sentiment regardless of positive vs negative polarity. Polarity is −1 for negative sentiment and 1 for positive sentiment.

There may be challenges when using sentiment models to detect neutral emotional text. For instance, neutrality in emotion can be different from neutrality in sentiment. For example, "are you on your way?" is a neutral sentence, but based on the context, this can have emotion like "confusion". And when the sentiment classifier is not trained on conversational texts, its accuracy on conversational text may be noisy. For example, a sentiment classifier may classify emotional sentences like "I am mad" or "I am happy" with a very low sentiment score, which are categorized into the neutral sentiment.

Multi-Label Classification

A neutral concept may be added to existing expressive concepts. In this case, one chat message can now have more than one label (one for an expressive concept, the other for neutral). Therefore, according to one aspect of the technology, the emotion classification may be treated as a multi-label classification. This allows the system to add more than one expressive concept per emoji or sticker. For example, this sticker sowing a person holding a flower: can now have 2 concepts: love and flower.

Multi-label classifications can be performed using models trained, e.g., with a pQRNN or SGNN. FIG. 8 illustrates a table 800 with predictions based on input text messages. Three predictions are provided for each message, which may identify the text being neutral and having an associated emotion.

Emotion Model De-Biasing

As indicated above with regard to FIGS. 5A-B, there may be some distribution imbalances in the data sets. This could reduce the accuracy of emotion models. In particular, emotion prediction models are based on emotion-bearing conversation elements, including visual elements (e.g., emojis, stickers) and textual (emotion phrases). This could introduce several content biases. As seen in the distributions in FIGS. 5A-B, emotion training data may be heavily biased towards positive emotion concepts (and similarly for emoji and sticker models).

What can cause this imbalance? Users do not express emotions in conversations in a uniform way. Intuitively, sharing happy news is easier and more pleasant than sharing bad ones. Overall, for many types of apps (e.g., chats or text messages), the vast majority may be Joy and Love expressions in the data. Some of the visual emotion-bearing elements are easier to include (from a UI perspective) than others, which is why they may appear more prevalently in the training data. Users can have unique preferences for using either visual or textual emotion-elements, which can dramatically skew the base element distribution.

Modeling approaches can address the bias problem with the following two methods: down sampling and prior normalization. For down sampling, the system may down sample training examples from top concepts (e.g., from the top 5, or more or less) such as Joy and Love, as they can make the vast majority of the data. As an example, in some models it has been observed the Joy concept to make up 33% of the entire training set. Down-sampling the data is helpful, but it may not be feasible to down sample to a uniform distribution, as the data can be very heavily skewed. This can be especially important for expressive models that contain hundreds of concept classes. As a further de-biasing measure, the distribution predicted by the model may be normalized by a prior based on the training input. For instance, the following element-wise normalization may be applied:

$$n_i = \frac{\frac{l_i}{p_i^d}}{\sum_i \frac{l_i}{p_i^d}}$$

where $l_i$ is the predicted logit for class i, $p_i$ is the prior frequency of class i, and then $n_i$ is the normalized logic, normalized over the full n vector output.

The prior damp factor d is held between [0,1] and determines the normalization strength. As an example, when d=0 no normalization is applied. Alternatively, when d=1 the output is fully normalized by the prior distribution (p). Setting the damp factor to 1 should theoretically remove the biases of the input training distribution, such that the expected output distribution is uniform in the case that no predicted class is positively correlated with the input (i.e., no emotion is expressed).

Neutral statements may be directly addressed in the model, which can further improve the output with regard to no-emotion statements. However, in practice, it is hard to separate data biases due to UI or context bias, to those simply introduced by user semantic preference. For this reason, a damp factor of 1 may lead to aggressive normalization that heavily promotes rare classes. Thus, in one example the system uses a damp factor of 0.75 as a starting point, which can later be adjusted per use-case.

UI Normalizers (Position Normalization)

Another way to address content bias is by applying UI normalizers, which take into account the UI constraints for using specific visual elements. This would address the "Ease of selecting visual content" bias. These may be used for Ad ranking, and more generally for recommendation systems. The approach is to add model parameters for a specific UI effect, but regularize the rest of the model to push more weight to that feature. The application of UI normalizers to ads typically involves decomposing the model into:

$$\log odds(ad,query,ui) = f(ui) + g(ad,query)$$

This equation describes a possible formulation of accounting for biases in the emotion modeling. f( ) is a function or learned model that estimates the impact of UI variations such as positions and number of clicks needed to arrive at a UI selection. g( ) is a basic scoring function that is unaffected by the UI. Each of these models produce individual log odds of their respective probabilities, which are summed together.

For ranking, one would use g(ad, query), thus ignoring the effect of the UI. This approach may be particularly useful if there are disparate UI treatments. For instance, one could use the device type (e.g, mobile phone, tablet computer, laptop, desktop smart watch, head-mounted wearable, in-home device, etc.), application version, screen size and/or other information as features of the UI. This is relevant in the case of emotion prediction based on visual features, since the data is mixed with inputs coming from desktop and mobile, which have drastically different UI implications. Emojis specifically can additionally be introduced via UI or text-conversion (e.g., typing :/ followed by space is converted to the corresponding emoji-unicode character, :/== ).

Fairness

Training data may include biases related to Fairness and Inclusion. This is partly due to being derived from person-to-person private conversations. To some extent, these biases can be mitigated by modeling concepts rather than explicit content.

Emotion models may be trained on a chat or text corpus, which can inherently contain biases towards named entities (e.g., people names and organization names). Such biases can propagate to the models, so that the models suffer from fairness issues. To mitigate this bias, one approach identifies named entities in the training data with a named entity recognizer, and mask them before training.

To identify the named entities in the conversational text, the BERT Named Entity Recognizer can be employed. It can detect many named entities. One approach is to focus on three particular entities (person names, locations and organization names), as these entities tend to have a bias based on people's preference. When the input text contains one of these named entities, it is masked by replacing the entity with the <NE> token. Some examples are shown in Table VI below.

TABLE VI named entity masking

| Original text | Masked text |
| --- | --- |
| I love Brand X | I love <NE> |
| I hate Person T | I hate <NE> |
| State N is great | <NE> is great |

Empathy

Another aspect of the technology that can be beneficial in many apps is to estimate empathy through predicted emotions. See table VII below for examples of direct and induced predictions based on a given text query.

TABLE VII

| Direct predictions | Query | Induced predictions |
| --- | --- | --- |
| Strong, Happy, Proud | you got it! | Happy, Celebrating, Strong |
| Furious, Angry, Evil | you messed it up! | Angry, Crying, Sad |

In one scenario, when users query or instruct an app they may express their emotions, as shown in the examples of Table VIII

TABLE VIII

| Query or Command to an App | Emotion |
| --- | --- |
| broadcast mom I am so sorry | Sadness |
| I don't want to be down here all along that makes me feel lonely | Sadness |
| make an announcement you kids are pretty darn cute thank you for doing what I asked | Joy |
| Hey baby stop messing with the thermostat | Anger |
| Ok but I hear yelling | Fear |

Machine Learning and Neural Network Examples

As noted above, the models and approaches discussed herein may be used in a variety of applications and services. This can include suggesting which sticker, emoji and/or GIF to include or otherwise use in a message to another user, to an app, or to a device. The models may be generated using neural networks, such as SGNN and/or QRNN-type neural networks, which may be trained on a particular corpus of data. For instance, the corpus may be text messages, chats, comments for videos or videoconferencing, an automated help feature of an on-line application, an assistant feature of a client computing device, etc. Thus, training inputs may be selected so that the models are tailored for specific apps or services. This can be particularly beneficial for on-device models that may have strict storage and speed requirements.

According to aspects of the technology, a machine learning approach is employed in order to generate effective predictions for the emotion of a user based on messages they send in a conversation (direct emotion prediction), for predicting the emotional response of a user (induced emotion prediction), and predicting appropriate graphical indicia (e.g., emoji, stickers or GIFs). Fully supervised and few-shot models are trained on data sets that may be particularly applicable to specific communication approaches (e.g., chats, texts, online commenting platforms, videoconferences, support apps, etc.). Some models may be large-scale back-end models that can be hosted on cloud-based servers, while other models may be smaller-scale models that are employed on end-user/client devices that may be resource constrained.

Example Systems

The input (training data) to a given model can include, e.g., a text corpus that may be associated with a particular communication type (e.g., chat or online commenting). This can include keywords, phrases, full sentences, paragraphs, etc. Neutral emotion text may be identified (labeled), so that the models may be trained to predict emotions for emotional text and avoid predicting emotions for non-emotional text.

Various types of neural networks may be used to train the models. These can include, in addition or alternative to pQRNN and SGNN, Deep Neural Networks (DNNs), Convolutional Neural Networks (CNNs), and the like. By way of example, a pQRNN or SGNN model may be trained for emotion classification and converted to a tflite model, which can be used for on-device prediction. The models may be trained offline, for instance using a back-end remote computing system (see FIGS. 9A-B) or trained by the (on-device) computing system of a user device. Once trained, the models may be used by client devices or back-end systems to suggest graphical indicia to a user.

Figure 9A:
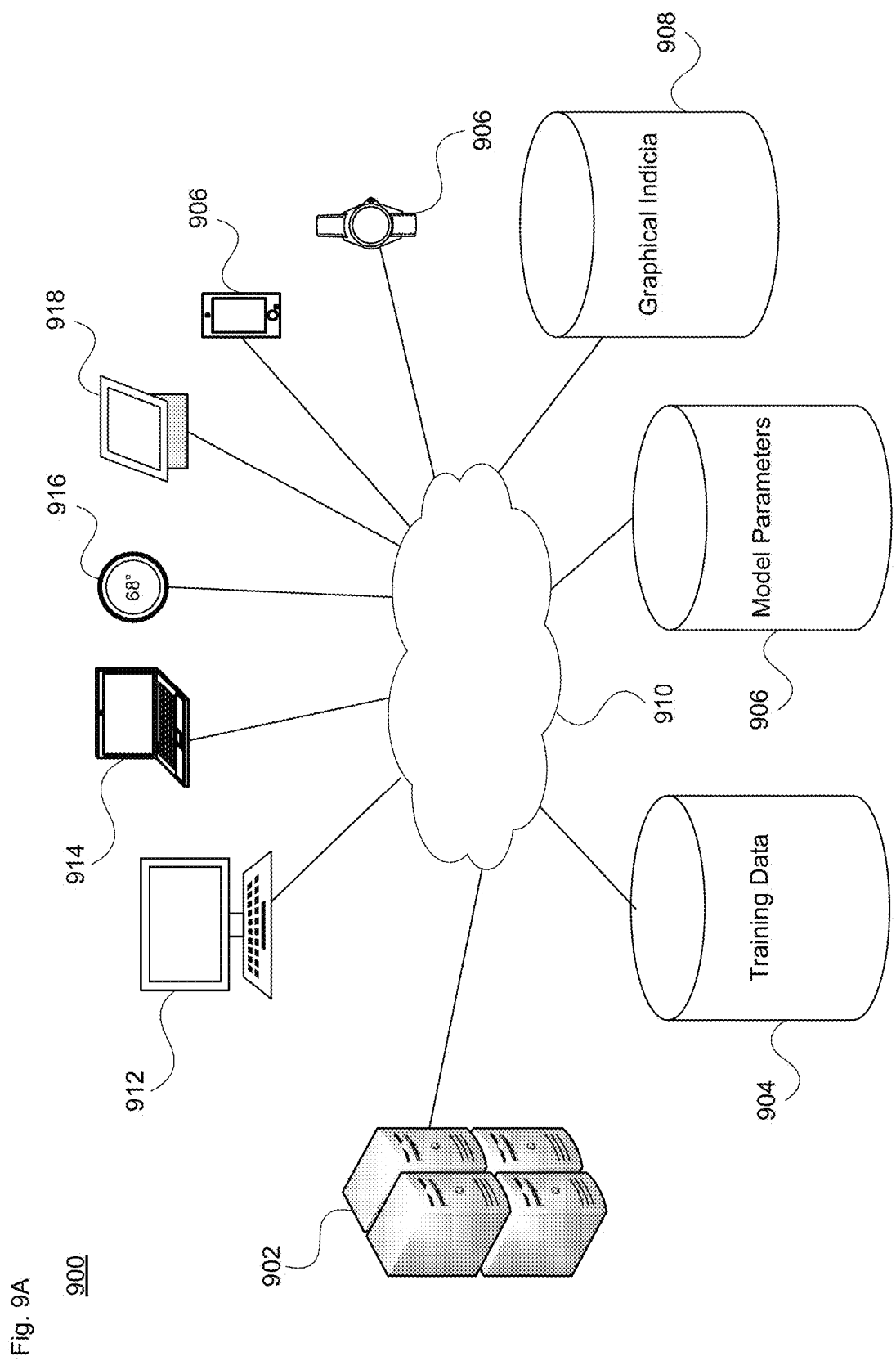
FIGS. 9A-B illustrate a computing system in accordance with aspects of the technology.
Figure 9B:
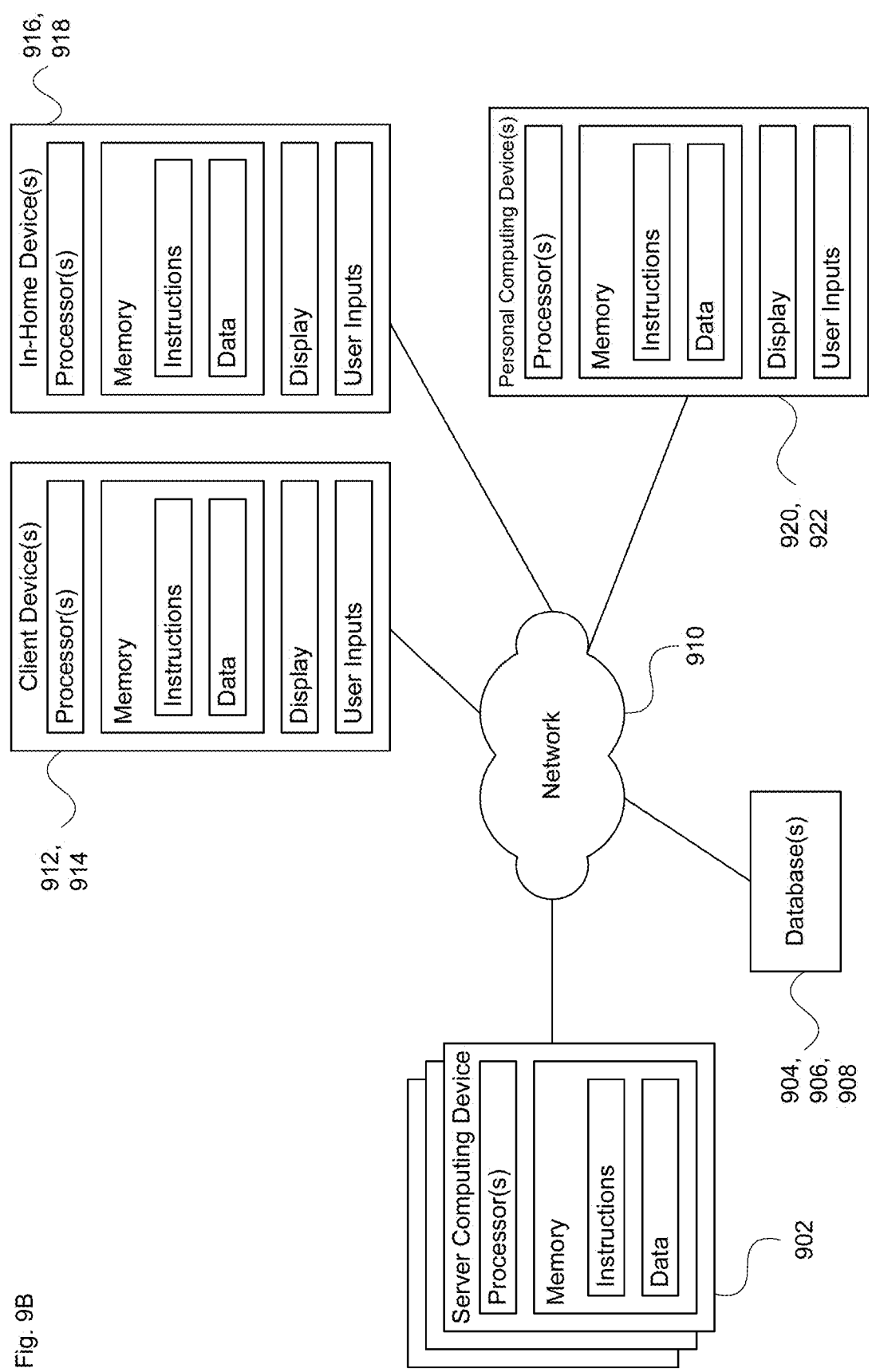

One example computing architecture is shown in FIGS. 9A and 9B. In particular, FIGS. 9A and 9B are pictorial and functional diagrams, respectively, of an example system 900 that includes a plurality of computing devices and databases connected via a network. For instance, computing device(s) 902 may be a cloud-based server system. Databases 904, 906 and 908 may store training data, model parameters and graphical indicia, respectively. The server system may access the databases via network 910. Client devices may include one or more of a desktop computer 912, a laptop or tablet PC 914, in-home devices that may be fixed (such as a temperature/thermostat unit 916) or moveable units (such as smart display 918). Other client devices may include a personal communication device such as a mobile phone or PDA 920, or a wearable device 922 such as a smart watch, head-mounted display, clothing wearable, etc.

As shown in FIG. 9B, each of the computing devices 902 and 912-922 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC or other hardware-based processor. Although FIG. 9B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 902. Accordingly, references to a processor or computing device will be understood to include references to a collection of processors or computing devices or memories that may or may not operate in parallel.

The raw data (training data) may be used with contextual information (e.g., type of communication, application type, device features and characteristics) as input to an emotion model to make certain predictions, such as direct emotion predictions, induced emotion prediction, or predicting appropriate graphical indicia based on an identified emotion. In addition, model parameters may also be used when training the model(s).

The computing devices may include all of the components normally used in connection with a computing device such as the processor and memory described above as well as a user interface subsystem for receiving input from a user and presenting information to the user (e.g., text and/or graphical indicia). The user interface subsystem may include one or more user inputs (e.g., a mouse, keyboard, touch screen and/or microphone) and one or more display devices (e.g., a monitor having a screen or any other electrical device that is operable to display information (e.g., text and graphical indicia). Other output devices, such as speaker(s) may also provide information to users.

The user-related computing devices (e.g., 912-922) may communicate with a back-end computing system (e.g., server 902) via one or more networks, such as network 910. The network 910, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 902 may include one or more server computing devices that are capable of communicating with any of the computing devices 912-922 via the network 912. Information from emotion-related classifications performed by the server may be shared with one or more of the client computing devices, such as by suggesting an emoji, sticker or GIF to a user.

In another example, each client computing device may be a personal computing device intended for use by a respective user and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. The client computing devices may be capable of running the on-device models discussed herein.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

By way of example, while aspects of the technology are based on text input, the technology is applicable in many other computing contexts other than text-centric applications. One such situation includes adaptively customizing/changing the graphical user interface based on detected emotions. For instance, in a customer support platform/app, the color of the UI presented to the customer support agent could change (e.g., to red or amber) when it is perceived that customers are beginning to get frustrated or angry. Also, some applications and services may employ a "stateful" view of users when providing general action suggestions and in surfacing information that is more tailored to the context of a specific user. In a query-based system for a web browser, an emotion classification signal may be fed into the ranking system to help select/suggest web links that are more relevant in view of the emotional state of the user. As another example, emotion classification can also be used in an assistance-focused app to suggest actions for the user to take (such as navigating to a place that the user often visits when in a celebratory mood, suggesting creating a calendar entry to go for a long jog, etc.).

The invention claimed is:

1. A method of training a computer-implemented emotion classification model, the method comprising:
   retrieving, from a database, training data for a text-based application;
   extracting from the training data, by one or more processors, a set of phrases that are associated with a set of taxonomy concepts;
   extracting from the set of phrases, by the one or more processors, a set of emotion examples based on emotion-bearing phrases in the set of phrases; and
   training, by the one or more processors, the emotion classification model based on a set of emotion-bearing phrases, wherein the trained emotion classification model associates one or more graphical indicia with at least one of a sender or a recipient of the text-based application.

2. The method of claim 1, wherein the training data includes one or more of corpus-based phrases, manually selected phrases, crowdsourced phrases, or tenor phrases.

3. The method of claim 1, wherein extracting the set of emotion examples includes performing at least one of exact matching, partial matching, or evaluating a semantic distance of a textual fragment with the set of phrases associated with the set of taxonomy concepts.

4. The method of claim 1, wherein training the emotion classification model based on the set of emotion-bearing phrases includes evaluating emotion-neutral statements.

5. The method of claim 1, wherein training the emotion classification model comprises training a few-shot classifier, and the method further comprises:
   labeling a full corpus based on the trained few-shot classifier; and
   training a supervised classifier over the full corpus.

6. The method of claim 1, wherein extracting the set of phrases includes extracting only phrases with a least a threshold pointwise mutual information (PMI) value.

7. The method of claim 1, wherein the one or more graphical indicia comprise at least one of a set of emoji, a set of stickers, or a set of GIFs.

8. The method of claim 1, wherein the text-based application is one of a chat, a text chain, a videoconferencing application, a commenting platform, an automated help feature of an on-line application, or an assistant feature of a client computing device.

9. The method of claim 1, wherein training the emotion classification model based on the set of emotion-bearing phrases includes incorporating a sentiment signal during the training to obtain a joint emotion and sentiment model.

10. The method of claim 1, wherein training the emotion classification model based on the set of emotion-bearing phrases excludes predicting emotions for non-emotional text.

11. The method of claim 1, wherein training the emotion classification model based on the set of emotion-bearing phrases includes providing a multi-label classification that supports more than one expressive concept per graphical indicia.

12. The method of claim 1, wherein the method further includes performing down-sampling the set of taxonomy concepts.

13. The method of claim 1, wherein the method further includes applying one or more user interface normalizers associated with visual elements of a given user interface.

14. The method of claim 1, wherein the one or more graphical indicia includes multiple graphical indicia associated with different classes, and the method includes mapping each class to a particular emotional or non-emotional concept in a set of concepts.

15. The method of claim 14, wherein one or more concepts in the set of concepts are extracted as keywords that appear in a vicinity of a corresponding one of the multiple graphical indicia in the text-based application.

16. The method of claim 15, wherein the keywords are used for direct token replacement in a keyboard model.

17. The method of claim 14, wherein the emotion classification model is configured to predict an emotion of a user based on one or more messages sent in a conversation using the text-based application.

18. The method of claim 1, wherein the emotion classification model is configured to predict a list of concepts for an input message of the text-based application.

19. The method of claim 1, wherein the emotion classification model is configured to suggest a particular graphical indicia.

20. The method of claim 1, wherein the emotion classification model is configured for use with the text-based application to support customizing or changing a graphical user interface based on a detected emotion.

* * * * *